United States Patent [19]

Araki et al.

[11] 4,110,670
[45] Aug. 29, 1978

[54] BRAKING APPARATUS

[75] Inventors: Tetsuro Araki; Hideaki Hayashi, both of Mitaka, Japan

[73] Assignee: Nippon Columbia Kabushikikaisha, Tokyo, Japan

[21] Appl. No.: 798,343

[22] Filed: May 19, 1977

[30] Foreign Application Priority Data

May 20, 1976 [JP] Japan ................................. 51-63413

[51] Int. Cl.² ........................................... D01H 7/22
[52] U.S. Cl. .................................... 318/212; 310/77; 192/2; 188/156; 188/158; 188/67; 188/84
[58] Field of Search ............... 318/212, 209, 372, 382; 310/77; 192/2; 188/156, 158, 67, 84

[56] References Cited

U.S. PATENT DOCUMENTS

| 2,746,583 | 5/1956 | Blevins | 192/2 |
| 2,932,785 | 4/1960 | Shovic | 192/2 |
| 3,999,365 | 12/1976 | Suzuki | 188/84 |

Primary Examiner—Herman J. Hohauser

[57] ABSTRACT

A brake apparatus is disclosed in which a rotary shaft coupled to a load to be rotated is rotatably supported by a plain bearing and a biasing device is located near the shaft to bias or move the shaft to the biasing device to applying braking force to the rotating load by the friction between the shaft and its bearing so as to stop the rotation of shaft and hence load.

8 Claims, 13 Drawing Figures

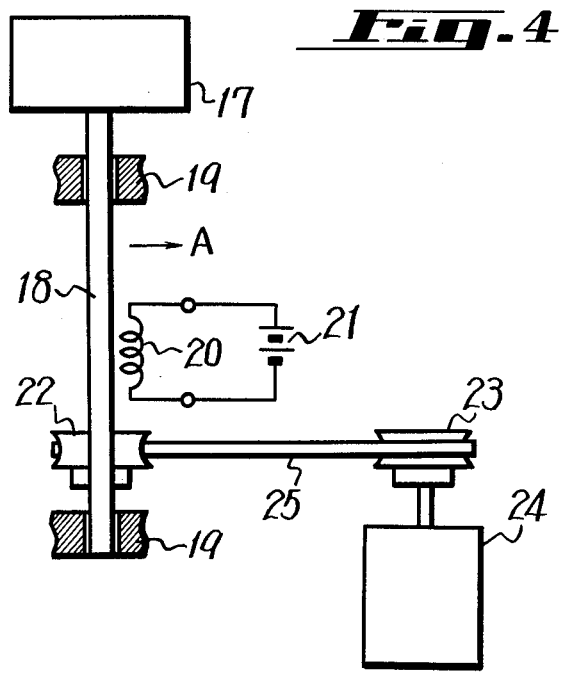
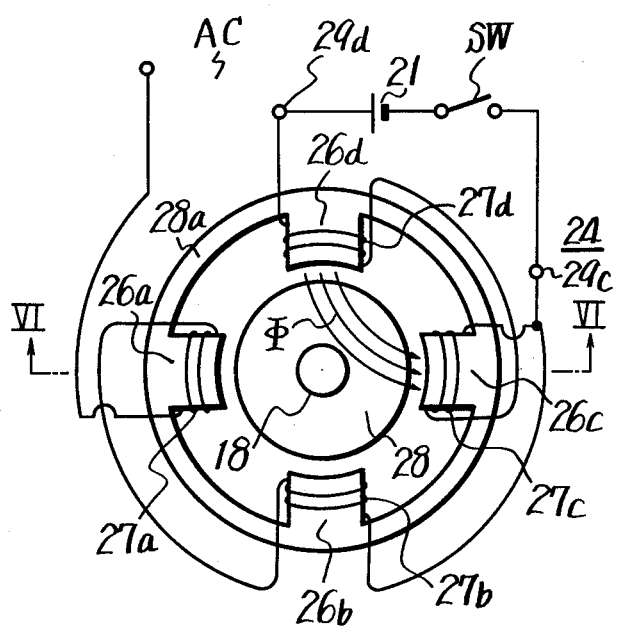
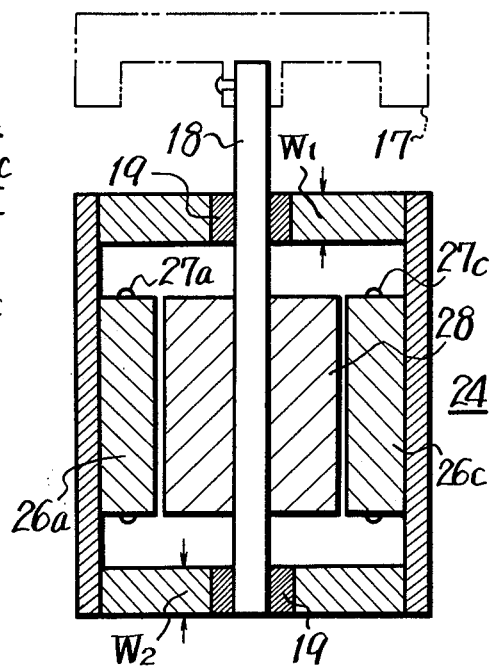

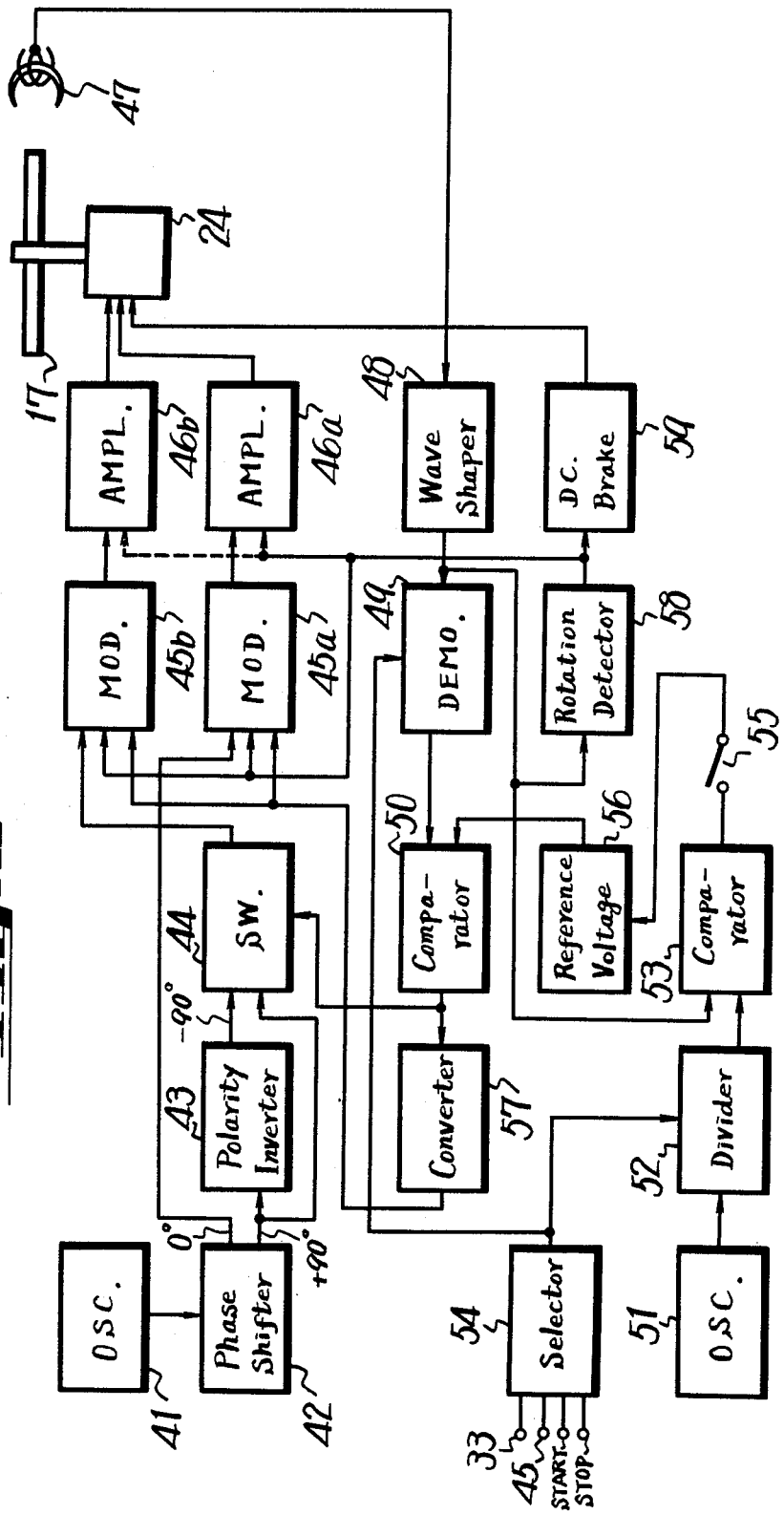

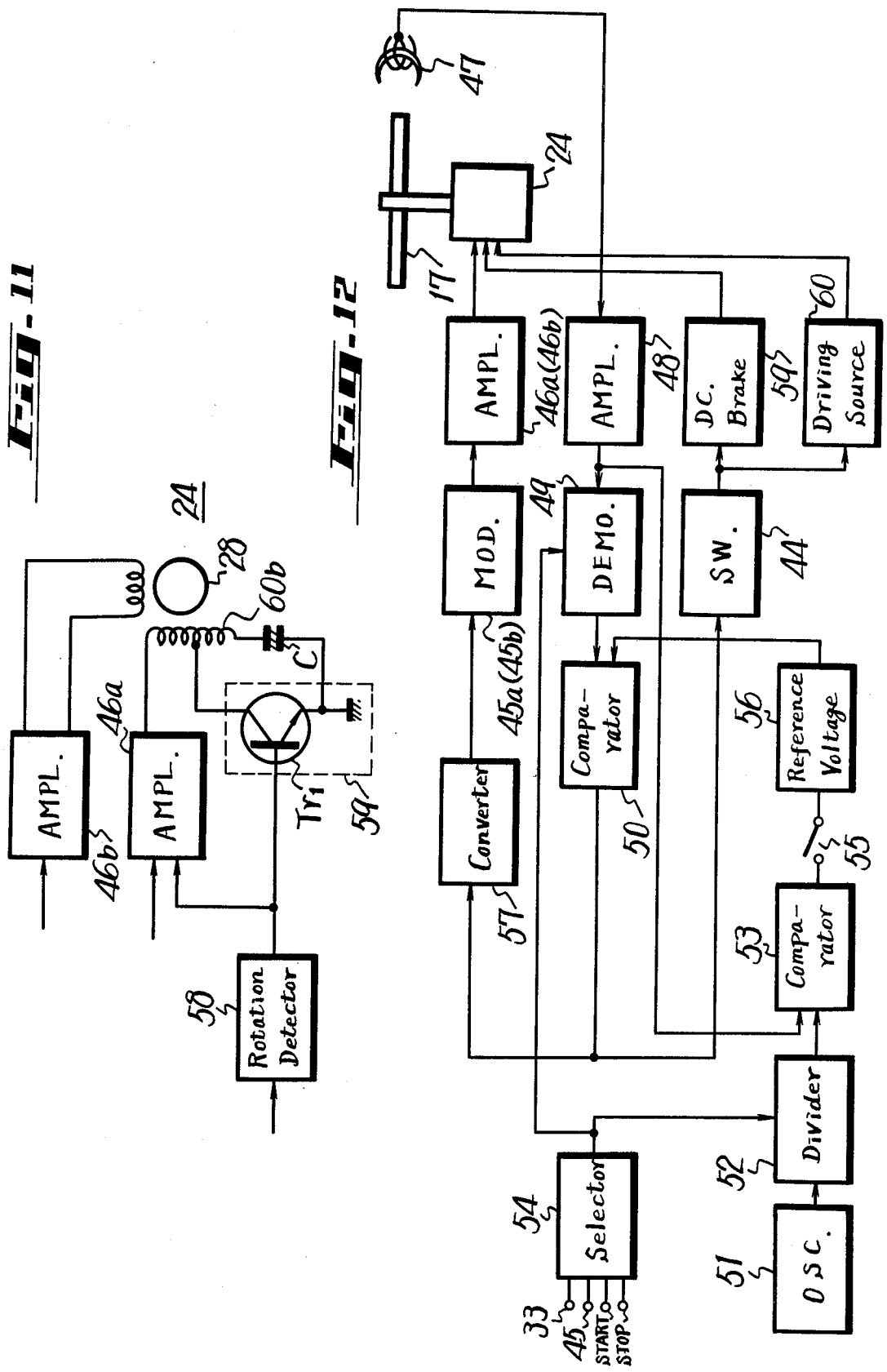

BRAKING APPARATUS

BACKGROUND OF THE INVENTION

1. Field of the Invention

The present invention relates generally to a brake apparatus, and is directed more particularly to a brake apparatus for applying braking force to a motor used in a tape recorder, record player or the like.

2. Description of the Prior Art

A prior art brake apparatus used for rapidly stopping a rotating load such as a turntable, reel or the like, which is coupled to the rotary shaft of a motor directly or indirectly, is formed as shown in FIG. 1. That is, an eddy current generating disc 3 such as an Aragos rotating disc is attached to a rotary shaft 2 of a motor 6 to which a load 1 such as a turntable or the like is attached, and a permanent magnet 4 is located near the disc 3 and/or a brake device 5 having a lining 5a is located near the turntable 1. When the rotating load or turntable 1 is desired to be stopped rapidly, the magnet 4 is moved to the disc 3 to brake the rotation of turntable 1 or the lining 5a of brake device 5 is urged to the turntable 1 to brake the latter.

With the above prior brake apparatus, in the case where the load 1 is braked by eddy current generating disc 3, when the rotating speed of load 1 becomes lower, a great braking force can not be generated, while in the case where the mechanical brake device 5 is used, a great braking force is obtained, but sliding or frictional sound is caused, which is undesirable.

Further, if in order to shorten a time period required to change the rotation speed of a rotary body, a brake apparatus is formed to generate a braking force, which can change the rotation speed of a rotating body or stop its rotation rapidly, the inertial moment of rotary body becomes high and hence a time period required to change or stop the rotation of motor is prolonged. As a result, a long time interval is necessary to exchange a record disc of a record player or to operate its pickup arm.

In general, in order to brake a motor by utilizing eddy current as described above and shown in FIG. 2, the motor 6 is disconnected from an AC voltage source 7 and stator or main windings 11 of motor 6 are supplied with DC current from a DC voltage source (not shown), or a series circuit consisting of a diode 13, a resistor 14 and a capacitor 15 is connected in parallel to the main windings 11 of motor 6, auxiliary (split-phase) windings 12 of motor 6 are connected to movable contact 8a of a switch 8 through a capacitor 16, the AC voltage source 7 is connected to fixed contacts 9 of switch 8, the connection point between the capacitor 15 and resistor 14 is connected also to the other fixed contact 10 and both ends of main winding 11 are connected to movable contact 8a and fixed contact 9 of switch 8. Now, if the movable contact 8a is connected to fixed contact 9 of switch 8, the motor 6 is driven. During this period, the capacitor 15 is charged through the diode 13 and resistor 14. While, if the movable contact 8a is connected to the other fixed contact 10, the charge stored in the capacitor 15 is discharged, hence a DC current flows through the main winding 11 of motor 6, and eddy current is produced on the rotor (not shown) of motor 6. Thus, a braking force is applied to motor 6.

FIG. 3 is a graph showing the relation between the rotation speed (r.p.m.) of motor 6 and the braking torque applied thereto when the DC current is fed to the main winding 11 of motor 6, in which the DC voltages 0, 10, 20, 30 and 40V (volt) are taken as parameters, respectively. From the graph of FIG. 3, it will be apparent that when the rotation speed of motor 6 becomes lower than 200 r.p.m., the braking torque decreases abruptly. Accordingly, it is easily understood that, in an ordinary tape recorder or record player in which its reel or turntable is rotated at a low speed such as 45~33⅓ r.p.m., the above brake apparatus using DC current has no substantial brake effect. In this case, if DC voltage is increased, a certain amount of braking torque can be produced. However, in this case such a defect is caused that the main winding of motor is damaged.

OBJECTS AND SUMMARY OF THE INVENTION

It is an object of the present invention to provide a novel brake apparatus free from the defects inherent to the prior art.

Another object of the invention is to provide a brake apparatus in which the winding of a motor located near the load driving shaft is supplied with DC current to move the shaft in the direction perpendicular to the axis of the shaft and to brake a rotating load rapidly with the friction between the shaft and its plain bearing.

A further object of the invention is to provide a brake apparatus in which a part of stator windings of an AC motor is supplied with DC current to rapidly stop the rotation of a load which is rotated at a relatively low speed by the motor.

A further object of the invention is to provide a brake apparatus in which a load rotated at relatively low speed is braked with the braking force which is larger than the braking force produced by eddy current loss or hysisteresis loss caused by the DC current supplied to the stator windings of a motor.

A still further object of the invention is to provide a brake apparatus in which a pulse voltage, whose pulse width is changed, is supplied to the stator winding of an AC motor, then integrated as DC voltage by the inductance component of the stator winding to move the rotary shaft of the motor in the radial direction to brake the motor.

A yet further object of the invention is to provide a brake apparatus in which when a load such as a turntable or the like coupled to an AC motor is changed from its rotation state to stop station, the rotation stop state is detected to automatically apply electric braking force to the turntable or the like.

According to an aspect of the invention there is provided a brake apparatus which comprises a bearing rotatably supporting a rotary shaft to which a load to be rotated is attached, and a device provided near the rotary shaft for biasing the shaft to the biasing device to brake the rotating load with the friction between the shaft and bearing.

The other objects, features and advantages of the invention will be apparent from the following description taken in conjunction with the accompanying drawings through which the like references designate like elements.

BRIEF DESCRIPTION OF THE DRAWINGS

FIG. 4 is a schematic diagram showing the theory of the invention;

FIG. 5 is a plan view of an AC motor to which the present invention is applied;

FIG. 6 is a cross-sectional view taken along the line VI—VI in FIG. 5;

FIG. 10 is a systematic block diagram showing an example of the invention;

FIG. 11 is a circuit diagram showing a part of the example shown in FIG. 10;

FIG. 12 is a systematic block diagram showing another example of the invention.

DESCRIPTION OF THE PREFERRED EMBODIMENTS

Figure 1:
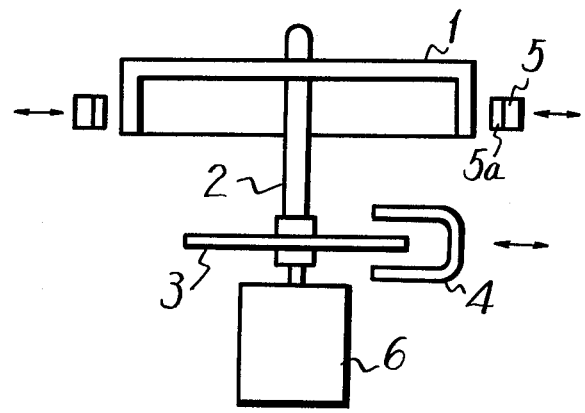
FIG. 1 is a schematic side view of a prior art brake apparatus for a turntable of a record player.

The theory of the present invention will be first described with reference to FIG. 4. In FIG. 4, 17 designates a load such as a turntable, reel or the like to be rotated which is attached to a rotary or driving shaft 18 made of magnetic material. The driving shaft 18 is rotatably supported by plain bearings 19 made of metal. Further, a pulley 22 is fixed to the driving shaft 18 and a shaft biasing device 20, which includes, for example, a winding, is disposed near the shaft 18 for moving or attracting the shaft 18 with load 17 in the direction of an arrow A. The biasing device 20 is supplied with a DC current from, for example, a DC voltage source 21. A pulley 23 is fixed to the rotary shaft of a motor 24, and a belt 25 is stretched between the two pulleys 22 and 23 to transmit the rotational force from the motor 24 to driving shaft 18.

When the biasing device 20 is supplied with DC current, it is magnetized to move or attract the driving shaft 18 in the direction of arrow A by a clearance between the shaft 18 and bearings 19. Thus, the bearings 19 are given with a constant pressure (thrust) by shaft 18. In this case, the driving shaft 18 is also supplied with the braking force caused by eddy current and hysteresis losses produced in driving shaft 18 against the biasing device 20 in addition to the braking force by the above frictional force. However, it is ascertained that the braking force due to the eddy current and hysteresis losses is very small, as will be described later.

A first example of the invention will be now described with reference to FIGS. 5 and 6. In the example, the biasing device for driving shaft 18 is not provided near the shaft 18 as in the case of FIG. 4, and stator windings of an AC motor 24 are utilized as the biasing device. In this example, a rotor 28 of motor 24 is integrated with the driving shaft 18 for the load 17 such as a turntable and hence, for example, a direct-drive type turntable is shown.

In the example shown in FIGS. 5 and 6, the AC motor 24 is a squirrel-cage induction motor, and windings 27a, 27b, 27c and 27d, which are wound on poles 26a, 26b, 26c and 26d of a stator 28a of motor 24, respectively, are connected in series. In order to move or attract the rotor 28 of AC motor 24 in one direction by the magnetic flux Φ generated between, for example, poles 26c and 26d as shown in FIG. 5, taps 29c and 29d are provided on the windings 27c and 27d wound on the poles 26c and 26d, respectively, and the DC voltage source 21 is connected between the taps 29c and 29d through a switch SW.

With the above AC motor 24 having the brake apparatus of the invention, when the switch SW is closed to supply a DC current to the stator windings 27c and 27d from the DC voltage source 21, the poles 26c and 26d are magnetized and the magnetic flux Φ is generated therebetween, as shown in FIG. 5. Thus, the rotor 28 and shaft 18, which is coupled to the rotor 28 integrally and has the load 17 such as a turntable, is attracted to, for example, the pole 26c by the magnetic flux Φ. In other words, the shaft 18 is moved to the pole 26c by the amount corresponding to the clearance between the shaft 18 and the bearings 19 to apply a pressure to the bearings 19 by the friction therebetween.

In the example of FIGS. 5 and 6, it is ascertained by experiments that when the shaft 18 is made of stainless steel with 10 φ; the load 17 fixed to the shaft 18 is selected to have the inertial moment of 233 Kg.cm²; the bearings 19 are made as oilless bearings; the bearing length $W_1$ of the upper bearing is selected as 5mm. ($W_1$ = 5mm.); that $W_2$ of the lower bearing as 10 mm. ($W_2$ = 10 mm.); aluminium is coated as a thin layer on the outer surface of rotor 28 which is formed by laminating a number of silicon steel plates; and the DC current of 1A (ampere) is supplied to stator windings 27c and 27d from the DC voltage source 21, the pressure exerted on the bearings 19 by the shaft 18 is about 1.2 Kg and the braking torque produced at this time is about 400 g.

Figure 2:
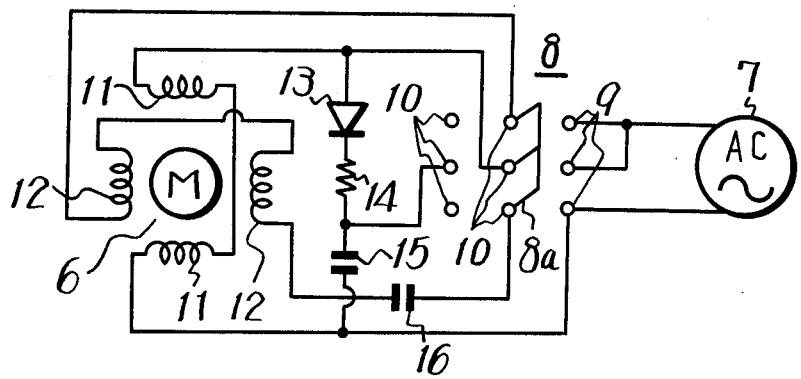
FIG. 2 is a circuit diagram of a prior art electric brake apparatus.
Figure 3:
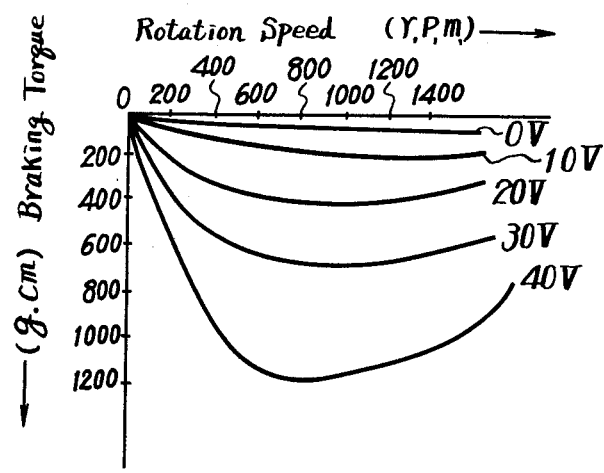
FIG. 3 is a graph showing the relation between the rotation speed of a motor and a braking torque applied thereto when various DC voltages are applied to the stator windings of the motor.
Figure 7:
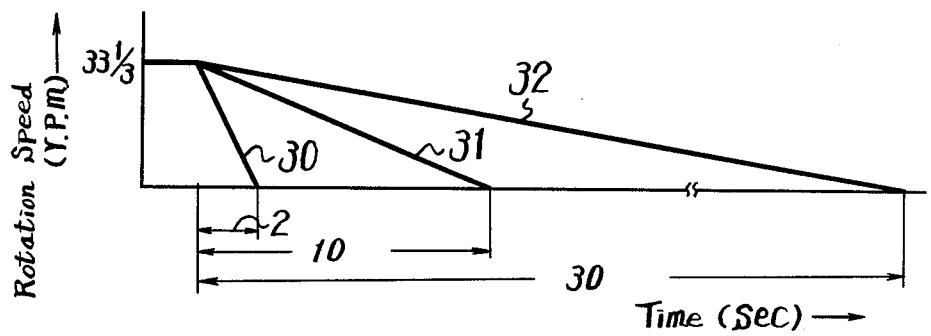
FIG. 7 is a graph showing the relation between the rotation speed of a turntable and time period when the turntable is stopped from the start of braking.

Further, a time interval within which after the turntable, which is rotated at the constant speed of 33 ⅓ r.p.m., is subjected to stop operation without any braking force and then is stopped, is measured with the result that the time interval is about 30 sec., as shown by a line 32 in the graph of FIG. 7. While, the same time interval for the case of the example shown in FIG. 2, in which DC current is supplied to the windings of motor 6 symmetrically, is about 10 sec. as indicated by a line 31 in the graph of FIG. 7 since no pressure is produced on the bearings and the braking force is produced only by eddy current and hysteresis losses. On the contrary, the same time interval in case of the present invention shown in FIGS. 4 to 6 is about 2 sec., as indicated by a line 30 in the graph of FIG. 7.

The abrasion of bearings 19 by friction between the same and shaft 18 will become, of course, problem in the present invention. After 400,000 experiments of such one experiment are carried out that a turntable is rotated at the speed of 300 r.p.m. for 12 sec. and the braking force such as attracting force of 1.2 Kg is applied to the turntable for 4 sec., which correspond to 36 times of the fact that the braking action is applied to the rotating turntable at the speed of 33⅓ r.p.m. once, the bearings are subjected almost no abrasion as shown in FIG. 8, and hence it is ascertained that the brake apparatus of the present invention can be well used practically.

Figure 9:
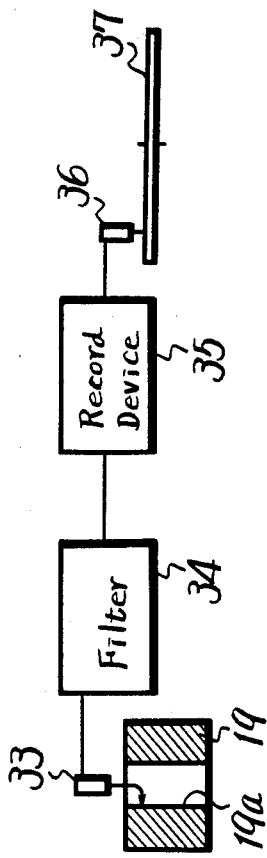
FIG. 9 is a systematic block diagram showing a measuring device by which the fact shown on the disc sheet of FIG. 8 is obtained.

FIG. 9 shows the apparatus for carrying out the above experiments. In FIG. 9, 33 denotes an electric micrometer which follows up an inner bore 19a of the bearing 19 before and after the experiment. The output from the micrometer 33 is fed to a filter circuit 34 so as to eliminate undesired frequency components therefrom, then fed to a recording device 35 and recorded by a recording pen 36 on a recording sheet or paper 37, as a circle.

Figure 8:
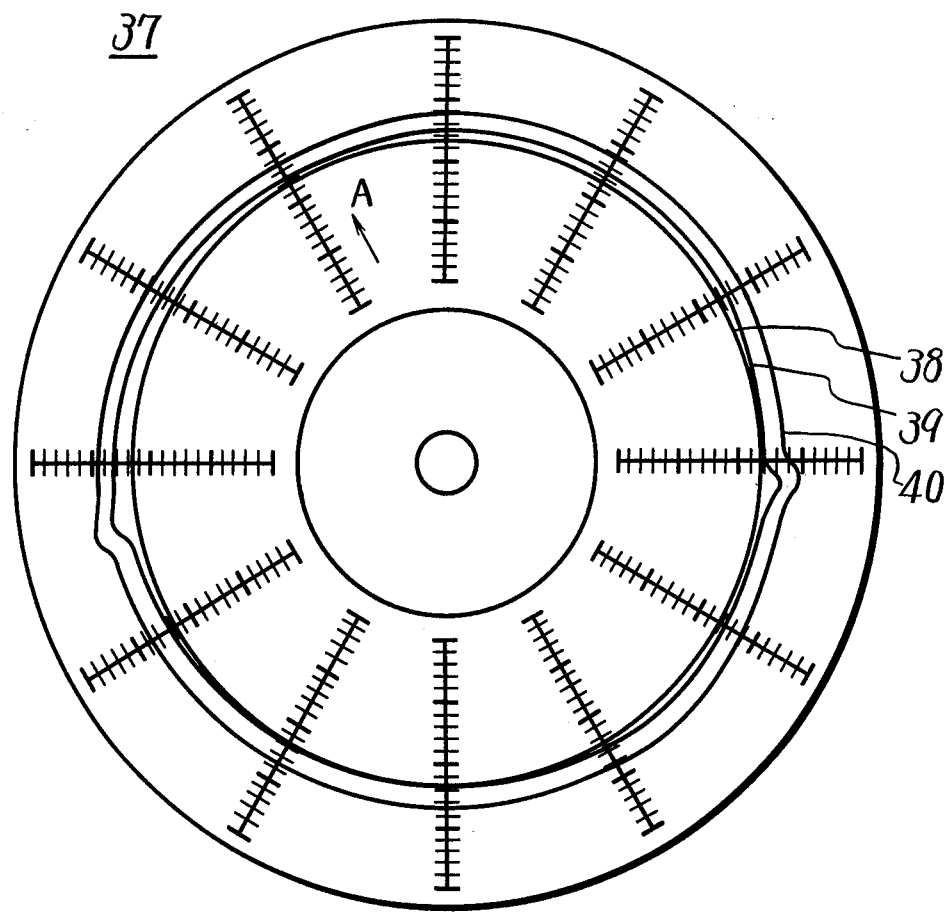
FIG. 8 is a plan view of a disc sheet showing the fact that the bearing used in the invention is not abraded so much after long use.

FIG. 8 shows the above paper 37 in which one scale of radial scales is 1 $\mu$ (micron); 38 indicates a true circle for comparison; 39 indicates a trace made by the micrometer 33 following up the inner bore 19a of bearing 19 before experiments, and 40 indicates a trace of the similar manner after 400,000 experiments, respectively. In fact, since the trace 40 substantially overlaps on that 39, the trace 40 in FIG. 8 is obtained by shifting the recording pen 36 by 1 $\mu$ in the radial direction. In FIG. 8, an arrow A indicates the direction of shaft 18 attracted by the biasing device.

As may be apparent from FIG. 8, it is ascertained that the abrasion of inner bore 19a of bearing 19 after 400,000 experiments in the attracting direction is about 0.5 $\mu$ and hence there occurs no problem in view of practical use of the present invention. In this respect, if it is taken in consideration that the belt drive system, as shown in FIG. 4, by way of example, or idler drive system, in which the bearings 19 for shaft 18 are always biased by the belt 25 or idler, is ordinarily employed, it will be understood that the bearings 19 are less affected by shaft 18 of the invention in which the friction is caused between the shaft 18 and bearings 19 in short time upon stopping as compared with the belt drive or idler drive system.

In the example of the invention shown in FIGS. 5 and 6, some of stator windings 27a, 27b, 27c and 27d at asymmetrical portions are provided with taps and supplied with DC voltage therethrough, but it is of course possible that auxiliary (split-phase) windings are additionally provided and supplied with DC voltage.

An example, in which the above brake apparatus of the invention is adapted to a direct-drive type record player, will be now described with reference to FIGS. 10 and 11. In this example, a 2-phase servo motor is used as the AC motor 24 and the turntable 17 of a record player (not shown) is directly coupled to be driven directly by servo motor 24. In FIG. 10, 41 indicates an oscillator circuit for driving the motor 24. The oscillated output signal from the oscillator circuit 41 is fed to a phase shifter circuit 42 which produces two signals different in phase by 90°. One of two signals from the phase shifter 42, or signal of 90° is fed to a polarity inverter circuit 43 and selection switch 44. The polarity inverter 43 produces a signal with the phase difference of 180° from that applied thereto, namely, produces a signal of −90° phase which is supplied to the selection switch 44 so as to drive the motor 24 in two directions. Thus, the selection switch 44 produces the signals for driving motor 24 in forward or backward direction in accordance with signals described later. The driving signal of 0° phase from the phase shifter 42 is fed to a first pulse width modulation circuit 45a so as to control the signal to be applied to motor 24 in pulse width modulation. The output signal from the first pulse width modulation circuit 45a is supplied through an amplifier circuit 46a to the first stator winding (not shown) of motor 24. The output signal of −90° or +90° phase from selection switch 44 is supplied to a second pulse width modulation circuit 45b and the output signal therefrom is fed through an amplifier circuit 46b to the second stator winding (not shown) of motor 24 to drive the motor 24. In order to keep the rotation speed of motor 24 constant, a reference signal, which is recorded on a magnetic material coated on the outer periphery of turntable 17, is detected by a detecting head 47. The detected signal from detecting head 47 is fed to a waveform shaping circuit 48 and the waveform-shaped output signal therefrom is fed to an FM demodulation circuit 49 whose output signal is applied to a comparator circuit 50. The output signal from the waveform shaping circuit 48 is also fed to a phase comparator circuit 53 which is also supplied with a signal of a reference phase for comparing both the signals. The reference signal supplied to the phase comparator 53 is produced in such a manner that the output signal from a reference oscillator 51, which uses a quartz oscillator, is supplied to a frequency divider circuit 52 to produce the above signal of reference frequency in accordance with the rotation speed of turntable 17. In this case, the frequency divider circuit 52 is controlled with the output signal from a selection circuit 54 which selects the rotation speed of motor 24 or turntable 17 to be stop, start, 33⅓ r.p.m., 45 r.p.m. modes and so on. The FM demodulation circuit 49 is also controlled with the output signal of selection circuit 54. The phase-compared output from phase comparator 53 is fed through a phase-locked button switch 55 to a reference voltage circuit 56 which produces a reference voltage for the rotation speed. This reference voltage of reference voltage circuit 56 is supplied to the comparator circuit 50 which compares the reference voltage of circuit 56 and the voltage from the FM demodulation circuit 49 which is changed in accordance with the rotation speed of turntable 17. The compared output signal from comparator 50 is fed to an absolute value converter circuit 57, which can control the driving signal for motor 24 even in the case that the rotation speed is lower and higher as compared with the reference speed, to detect the absolute value of compared output. The detected output signal of absolute value converter circuit 57 is fed to first and second pulse width modulation circuits 45a and 45b to control them, respectively. The output of waveform shaping circuit 48 is further fed to a rotation detecting circuit 58 to detect the rotation speed of turntable 17. The output of rotation detecting circuit 58 is supplied to first and second pulse width modulation circuits 45a and 45b, amplifier 46a (and 46b shown by the dotted line in FIG. 10) and also to a DC brake circuit 59, respectively, to rapidly stop the motor 24 within about 2 sec., by the theorem described above.

FIG. 11 is a connection diagram mainly showing the DC brake circuit 59 and 2-phase motor 24 shown in FIG. 10, in which a circuit consisting of a transistor $Tr_1$ and a capacitor c is connected, at its one end, to a stator winding 60b of 2-phase motor 24 and is generated at its other end.

The operation of the example of the invention shown in FIGS. 10 and 11 will be now described. When the selection circuit 54 is selected to change the rotating turntable 17 to the stopped state, the driving signals applied to the amplifiers 46a and 46b, which are different in phase by 90° during the rotation of motor 24 (turntable 17), become to have the phase difference of 180° because the control signal of selection circuit 54 is supplied through FM demodulation circuit 49 to comparator 50 and the output from the latter is supplied to selection switch 44 to switch the same. As a result, the reverse torque is generated in motor 24 and hence braking force is applied thereto. Upon the braking state, the rotation speed of turntable 17 is detected by detecting head 47. When the rotation speed arrives at a predetermined value, the rotation detecting circuit 58 produces an output which is fed to the transistor $Tr_1$ of DC brake circuit 59 to make it ON. Thus, due to the pulse voltage from pulse width modulation circuit 45a through the amplifier 46a, which pulse voltage is changed in width, a pulse current flows through the collector-emitter path of transistor $Tr_1$. This pulse current is integrated by the inductance component of stator winding 60b of motor 24 to be a DC current. This DC current serves a brake current to apply braking force to motor 24.

FIG. 12 is a block diagram showing another example of the invention. In this example, a capacitor advance type motor is employed as the AC motor 24 and, similar to the example shown in FIGS. 10 and 11, the motor 24 is driven with pulse width modulated signals. In the example of FIG. 12, the selection switch 44 selects forward driving signal and braking signal. When the rotating motor 24 is stopped, the output of selection switch 44 is fed to a driving source 60 to stop its output fed to motor 24 and the DC voltage from brake circuit 59 having a DC power source is fed to the stator winding (not shown) of motor 24. Thus, the shaft and rotor of motor 24 are biased or moved to cause the braking force as described above.

Further, when the turntable 17 rotated at the speed of, for example, 45 r.p.m. is changed to the rotation speed of 33⅓ r.p.m., the DC voltage of brake circuit 59 is supplied through the stator winding of motor 24 to amplifier 46a and pulse width modulation circuit 45a and then pulse-width-modulated to control the braking force.

Figure 13:
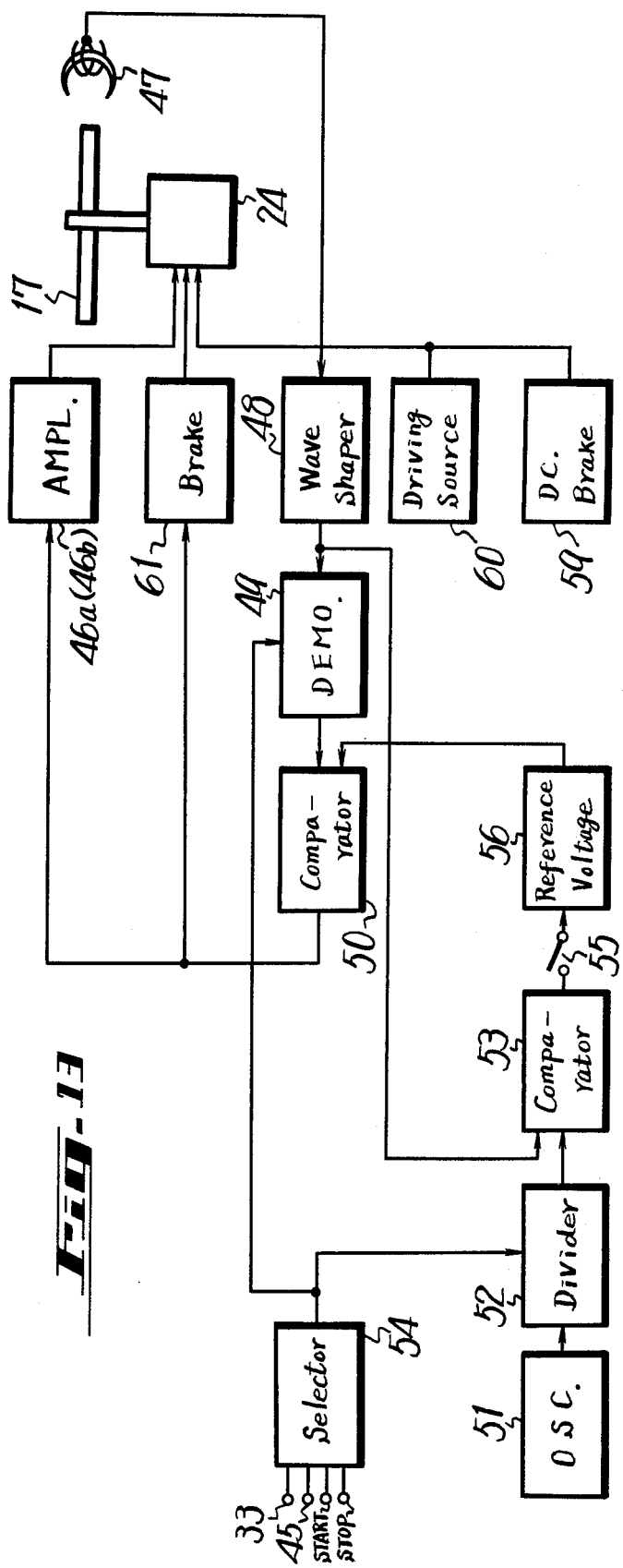
FIG. 13 is a systematic block diagram showing a further example of the invention.

FIG. 13 is a block diagram showing a further example of the invention in which a capacitor phase advance type motor is employed as the motor 24. Upon the driving of motor 24, the impedance of the transistor (not shown) in amplifier circuit 46a or 46b is changed, if necessary, to control the rotation of motor 24, while upon braking of motor 24, the DC voltage from DC brake circuit 59 is supplied to the stator winding (not shown) of motor 24 by operating a brake circuit 61.

According to the present invention constructed as above, the turntable of a record player, the capstan and reel of a tape recorder and so on which are rotated at a low speed can be stopped rapidly without no abrasion of bearings. Further, in the invention no special biasing device is provided and windings of a motor are utilized to stop the motor and power consumption is less, so that the braking action can be achieved at high efficiency.

It will be apparent that many modifications and variations could be effected by one skilled in the art without departing from the spirits or scope of the novel concepts of the invention, so that the scope of the invention should be determined by the appended claims.

We claim as our invention:

1. A brake apparatus for rotating body comprising:
   a. bearing means for rotatably supporting a rotary shaft to which a load to be rotated is fixed; and
   b. biasing means located near said shaft for biasing said shaft in the direction to said bearing means to cause frictional force between said shaft and bearing means so as to brake said load.

2. A brake apparatus as claimed in claim 1, in which said rotary shaft is a rotating shaft of an AC motor and said biasing means is a stator winding of said AC motor.

3. A brake apparatus as claimed in claim 1, in which said rotary shaft is a rotating shaft of an AC motor and an auxiliary winding of said AC motor is said biasing means.

4. A brake apparatus as claimed in claim 1, in which said rotary shaft is a rotating shaft of an AC motor and said biasing means is disposed in opposed relation to a rotor of said AC motor.

5. A brake apparatus according to claim 1 further comprising means for supplying DC current to said biasing means so as to magnetize said biasing means.

6. A brake apparatus as claimed in claim 5, in which said DC current supplying means is a DC current source.

7. A brake apparatus according to claim 1 further comprising means for supplying a pulse signal to said biasing means, said pulse signal being integrated by inductance components of said biasing means to be a DC signal.

8. A brake apparatus according to claim 1 further comprising means for detecting a rotation speed of said load and means supplied with an output of said detecting means for automatically selecting a signal supplied to said biasing means.

* * * * *